United States Patent
Weeks et al.

[11] 3,891,393
[45] June 24, 1975

[54] APPARATUS FOR SLURRYING SODA ASH

[75] Inventors: Lorne E. Weeks, Kenmore; Ronald W. Doran, Tonawanda, both of N.Y.

[73] Assignee: Intermountain Research and Development Corporation, Green River, Wyo.

[22] Filed: Dec. 3, 1973

[21] Appl. No.: 421,278

Related U.S. Application Data

[62] Division of Ser. No. 143,062, May 13, 1971, Pat. No. 3,802,848.

[52] U.S. Cl. ............... 23/271 R; 423/421; 118/303; 118/24
[51] Int. Cl. ........ C01d 7/00; B01f 3/12; B01d 5/20
[58] Field of Search ....... 23/271 R, 267 R; 118/303, 118/24; 23/267 R

[56] References Cited
UNITED STATES PATENTS

| | | | |
|---|---|---|---|
| 801,200 | 10/1905 | Bailey | 23/271 |
| 871,300 | 11/1907 | Schwarz | 23/271 |
| 1,889,642 | 11/1932 | Davis | 118/303 |
| 2,071,846 | 2/1937 | Lamb | 118/303 |
| 2,324,874 | 7/1943 | Peters | 118/303 |
| 2,601,355 | 6/1952 | Wyss | 118/303 |
| 2,978,299 | 4/1961 | Milne | 23/271 |
| 3,477,808 | 11/1969 | Hellmers | 23/271 |
| 3,533,829 | 10/1970 | Quanguin | 118/303 |
| 3,606,093 | 9/1971 | Morse | 23/271 |

FOREIGN PATENTS OR APPLICATIONS

| | | | |
|---|---|---|---|
| 26,152 | 1908 | United Kingdom | 23/271 |
| 1,412,273 | 1964 | France | 118/303 |
| 60,839 | 1892 | Germany | 118/303 |

*Primary Examiner*—Norman Yudkoff
*Assistant Examiner*—S. J. Emery

[57] ABSTRACT

A method and apparatus for forming soda ash slurries is described wherein large quantities of soda ash are dispersed and wetted with a soda ash solution to form a mixture of saturated soda ash and sodium carbonate monohydrate.

3 Claims, 1 Drawing Figure

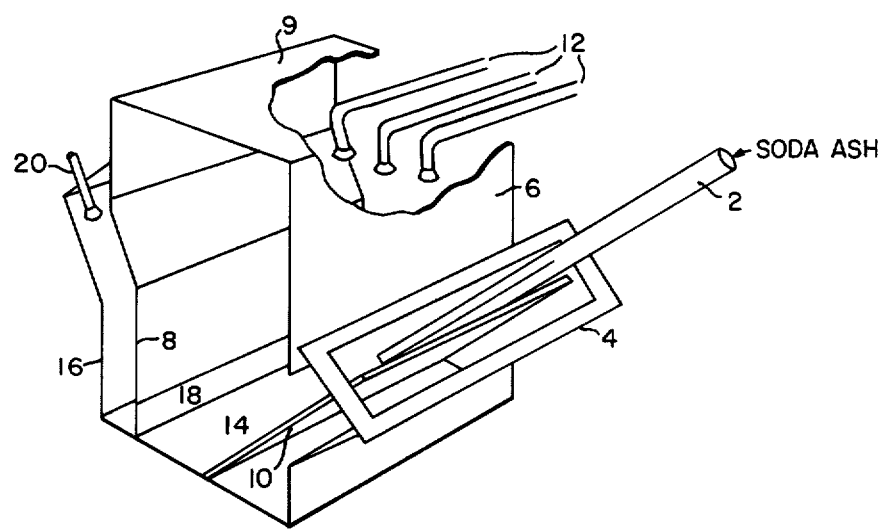

ण्ं3,891,393

APPARATUS FOR SLURRYING SODA ASH

This is a division, of application Ser. No. 143,062, filed May 13, 1971 now U.S. Pat. 3,802,848.

BACKGROUND OF THE INVENTION

A. Field of the Invention

The invention covers a method for making up slurries of soda ash and water and the apparatus for effecting these slurries.

B. Description of the Prior Art

It is known that soda ash can be stored and dispensed in the form of an aqueous mixture. Upon mixing sufficient soda ash with water, part of the soda ash dissolves to form a saturated sodium carbonate solution while the remainder, which does not dissolve, is converted to crystals of sodium carbonate monohydrate that settle to the bottom of the mixture as a fluid, non-hardening slurry. This method of storage is desirable because the slurry has a considerably higher apparent density than the dry soda ash from which it was made. As a result it is possible to store up to 50 percent more soda ash in a given volume as a slurry rather than in its dry form. The soda ash is recovered from the storage tank by removing the upper layer of saturated soda ash solution. In many cases the uniformity of the saturated soda ash solution permits dispensing of the soda ash volumetrically with acceptable accuracy. A typical method for storing and withdrawing of soda ash slurries is described in U.S. Pat. No. 3,357,801 issued on Dec. 12, 1967 to William H. Weed et al.

The soda ash is replenished in the storage tank most conveniently by adding soda ash and water in the form of a slurry. This increases the amount of both saturated soda ash and sodium carbonate monohydrate crystals in the storage tank.

One of the difficulties that has arisen in this system has been in properly slurrying the soda ash with water or an aqueous sodium carbonate solution, prior to introducing the soda ash into the storage tank. It is important that the slurrying stage provide for thorough wetting and dispersion of the dry soda ash in the liquid to avoid any caking or lumping of the soda ash. Such caking is most undesirable because such caked particles of soda ash are converted to sodium carbonate monohydrate only at their surface. The caked particles contain undissolved soda ash in their center enclosed within a layer of sodium carbonate monohydrate crystals. This nonhomogeneous particle does not dissolve readily and the desired increased density of the slurry and uniformity of the stored soda ash is not obtained. As a result, it is desirous to develop a process and equipment which will provide for complete wetting and dispersion of the dry soda ash with the liquid to be added to the storage tank.

SUMMARY OF THE INVENTION

It has been found that complete wetting of soda ash with an aqueous fluid can be achieved by conveying soda ash particles through a conduit to a divergent injector nozzle located within a housing, dispersing the soda ash particles through the injector nozzle in a substantially flat plane, said plane being inclined downwardly from the horizontal and substantially parallel to an inclined splash plate located at the base of said housing below the dispersed soda ash particles, introducing an aqueous fluid downwardly onto and in contact with the dispersed soda ash particles to wet them and to form a slurry thereof, passing said slurry downwardly along the inclined splash plate to an opening in the base of the housing and discharging the slurry through the opening to a storage area below.

BRIEF DESCRIPTION OF THE DRAWING

In the drawing there is illustrated a perspective view of the apparatus for forming the soda ash slurry; also shown in the drawing is a tank vent and wet scrubber built into one side of the apparatus.

DESCRIPTION OF THE INVENTION AND THE PREFERRED EMBODIMENTS

The invention can best be described by reference to the attached drawing. The slurrying apparatus which is shown in the drawing is fitted atop a storage tank, not shown, so that the final slurry is fed by gravity downward into the storage tank. The soda ash particles are conveyed through a conduit, not shown, from the truck or rail car by air conveying or other known techniques for moving dry particles through a conduit.

The air conveyed soda ash particles enter the divergent injector nozzle 2 which is located in an opening 4 of the slurrying apparatus. The slurrying apparatus is made up of a housing which is formed by walls 6 and 8 and a roof 9. The housing is also enclosed by side walls, not shown. The soda ash particles upon being pushed through the divergent injector nozzle 2 are dispersed in a substantially flat plane within the housing. The plane formed by the soda ash particles is substantially parallel to the splash plate 10 shown at the base of the housing below the soda ash particles. Aqueous fluid, under high pressure, is passed through conduits 12 and sprayed on the soda ash particles as they pass over the splash plate. The soda ash particles, which are spread out in a substantially thin, flat plane, are readily wetted by the fluid which is showered down on the particles from conduits 12. As a result of this, thorough wetting of the particles, without lumping, is obtained. The wetted particles then form a slurry which passes downwardly along the inclined splash plate 10 and finally through opening 14 in the base of the slurry apparatus and into the storage tank below.

As large amounts of slurry are passed through opening 14 in the slurrying apparatus, it will be realized that large quantities of air will be displaced from the storage tank below the slurrying apparatus. Accordingly, the present invention also contemplates a vent which is formed by member 16 and wall 8 of the slurrying apparatus. Air which is displaced from the tank below the slurrying apparatus exits through the opening 18 in the slurrying apparatus and passes upwardly and out to the atmosphere. To avoid the possibility of fines exiting from the vent, there is included fluid carrying means 20 which injects water or a sodium carbonate solution into the vent to scrub down any fines and permit only air and water vapour to escape from the vent.

The above described slurrying system has many advantages. Initially, the unit prevents atmospheric "dusting" of soda ash during the mixing and slurrying operations. Such dusting is extremely undesired because of the handling problem it presents to the operators conducting the slurrying operation and further because it contributes to pollution of the air in the loading area.

The present system also precludes the possibility of aqueous fluid backing up into the delivering vehicle. This is most important since any water which backs up into the delivery vehicle will immediately convert the soda ash in the delivery vehicle into an unmanageable, solid wet solid which is impossible to air convey through tubes. Most importantly, the slurrying method and apparatus permit the handling of large quantities of soda ash without difficulty and without any caking or lumping of the soda ash fed to the slurrying unit.

In the operation of the slurrying apparatus, the liquid which is used to form the soda ash slurry can be either water or sodium carbonate solution. Normally, some of the sodium carbonate solution which is in the storage tank is recirculated through the conduits 12 in order to slurry up additional soda ash. Water may be added as is needed to regulate the depth of the sodium carbonate monohydrate layer which is desired in the storage facility.

Pursuant to the requirements of the patent statutes, the principle for this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. An apparatus for slurrying soda ash comprising an enclosed housing, an inclined divergent injection nozzle extending through an opening in one side of said housing for dispersing soda ash particles in substantially a flat plane, an inclined splash plate attached along its lower edge to the base of said housing and substantially parallel to and below the plane of soda ash particles introduced through said nozzle, a plurality of liquid spraying means located above said nozzle for dispersing fluid downwardly onto the soda ash particles and splash plate, and an opening in the base of said housing running alone the lower edge of said splash plate to permit the resulting soda ash slurry to exit from the lower end of the splash plate into a storage tank, said storage tank being located directly below and in sealing relationship with said opening.

2. The apparatus of claim 1 wherein a vent channel is formed for removing air displaced from said storage tank, wherein a side of housing constitutes one wall of the vent channel, a vertical member exterior to the housing constitutes the other, outer wall of said vent channel, and an opening in said side of said housing permits air to flow said storage tank through said opening and up through the vent channel to the atmosphere.

3. Apparatus of claim 2 wherein said vent channel has fluid conduits located therein to disperse fluids downwardly through said vent channel to scrub particulate matter out of the air in said vent channel.

* * * * *

UNITED STATES PATENT OFFICE
CERTIFICATE OF CORRECTION

PATENT NO. : 3,891,393
DATED : June 24, 1975
INVENTOR(S) : Lorne E. Weeks and Ronald W. Doran It is certified that error appears in the above-identified patent and that said Letters Patent are hereby corrected as shown below:

Column 2, line 57, "vapour" should read --vapor--.

Column 3, line 18, "for" should read --of--.

Column 4, line 11, "alone" should read --along--.

Column 4, line 18, "of housing" should read --of said housing--.

Column 4, line 22, "flow said storage" should read --flow from said storage--.

Signed and Sealed this

Third Day of August 1976

[SEAL]

Attest:

RUTH C. MASON
Attesting Officer

C. MARSHALL DANN
Commissioner of Patents and Trademarks